United States Patent
Peng et al.

(10) Patent No.: US 12,071,360 B2
(45) Date of Patent: Aug. 27, 2024

(54) DEVICES FOR CONTROLLING TO REMOVE FOOD WASTE DIGESTION FOAM

(71) Applicant: CHANGZHOU UNIVERSITY, Jiangsu (CN)

(72) Inventors: Mingguo Peng, Changzhou (CN); Jianfeng Ma, Changzhou (CN); Yang Qu, Changzhou (CN); Linqiang Mao, Changzhou (CN); Erdeng Du, Changzhou (CN); Fang Zhu, Changzhou (CN); Weibing Zhu, Changzhou (CN); Dongxiao Shi, Changzhou (CN); Qiuya Zhang, Changzhou (CN); Yanqiu Zhang, Changzhou (CN); Lu Zheng, Changzhou (CN)

(73) Assignee: CHANGZHOU UNIVERSITY, Changzhou (CN)

(*) Notice: Subject to any disclaimer, the term of this patent is extended or adjusted under 35 U.S.C. 154(b) by 0 days.

(21) Appl. No.: 18/455,605

(22) Filed: Aug. 24, 2023

(65) Prior Publication Data
US 2024/0043299 A1    Feb. 8, 2024

Related U.S. Application Data

(63) Continuation-in-part of application No. PCT/CN2022/111312, filed on Aug. 10, 2022.

(30) Foreign Application Priority Data

Aug. 4, 2022   (CN) ................. 202210933815.X (51) Int. Cl.
C02F 3/28      (2023.01)
B01D 19/02     (2006.01)
C02F 103/32    (2006.01)

(52) U.S. Cl.
CPC ............ *C02F 3/2866* (2013.01); *B01D 19/02* (2013.01); *C02F 2103/32* (2013.01);
(Continued)

(58) Field of Classification Search
CPC ................ C02F 3/2866; C02F 2103/32; C02F 2203/006; C02F 2209/03; C02F 2209/06;
(Continued)

(56) References Cited

U.S. PATENT DOCUMENTS

2015/0275234 A1   10/2015   Ketola et al.

FOREIGN PATENT DOCUMENTS

CN   102728196 A  * 10/2012
CN   102902230 A    1/2013
(Continued)

OTHER PUBLICATIONS

Machine-generated English translation of CN 102728196, generated on Apr. 1, 2024.*
(Continued)

*Primary Examiner* — Fred Prince
(74) *Attorney, Agent, or Firm* — METIS IP LLC (57) ABSTRACT

Devices for controlling to remove food waste digestion foam are provided. The device includes a digestion tank. The digestion tank includes two hermetically sealed boxes. Each of the two boxes is opened with a liquid inlet connected to an interior of each of the two boxes. A conveying mechanism is connected between the two boxes. The conveying mechanism conveys a gas in the two boxes in a reciprocal manner. The gas in the two boxes is conveyed in the reciprocal manner through the conveying mechanism to generate a pressure difference between the two boxes distributed left and right to remove the foam, which adopts physical defoaming without adding any reagent, is cost-effective and efficient, and does not affect an anaerobic (Continued)

reaction process due to addition of a chemical defoaming agent. The entire device has a simple structure and is easy to operate, and the process is controllable.

7 Claims, 2 Drawing Sheets (52) U.S. Cl.
CPC .... *C02F 2203/006* (2013.01); *C02F 2209/03* (2013.01); *C02F 2209/06* (2013.01); *C02F 2303/12* (2013.01); *C02F 2303/14* (2013.01); *C02F 2305/06* (2013.01)

(58) Field of Classification Search
CPC .............. C02F 2303/12; C02F 2303/14; C02F 2305/06; B01D 19/02
USPC ........................................ 210/603, 252, 259
See application file for complete search history.

(56) References Cited

FOREIGN PATENT DOCUMENTS

| CN | 105972203 A | 9/2016 |
|----|-------------|--------|
| CN | 106471126 A | 3/2017 |
| CN | 206033295 U | 3/2017 |
| CN | 107098469 A | 8/2017 |
| CN | 110551619 A | 12/2019 |
| CN | 212783711 U | 3/2021 |
| CN | 215232283 U | 12/2021 |
| FR | 2152431 A2 | 4/1973 |
| GB | 1244577 A | 9/1971 |
| JP | H05154994 A | 6/1993 |
| JP | 2003340498 A | 12/2003 |
| JP | 2004057854 A | 2/2004 |

OTHER PUBLICATIONS

Notification to Grant Patent Right for Invention in Chinese Application No. 202210933815.X mailed on Oct. 25, 2023, 4 pages.
First Office Action in Chinese Application No. 202210933815.X mailed on May 31, 2023, 15 pages.
"Waste-to-Energy Research & Technolgy (China)", Web page <http://wtert.zju.edu.cn/cn/news_detail.asp?id=58>, Sep. 21, 2011, 7 pages.
"16 Technical Questions and Answers of Anaerobic Reactor", Web page <http://www.envirunion.com/newsinfo-12501.html>, Jan. 2, 2019, 10 pages.
Yang, Xingsheng et al., Microorganisms in the Typical Anaerobic Digestion System of Organic Solid Wastes: A Review, Chinese Journal of Biotechnology, 37(10):3425-3428, 2021.

* cited by examiner

DEVICES FOR CONTROLLING TO REMOVE FOOD WASTE DIGESTION FOAM

CROSS-REFERENCE TO RELATED APPLICATIONS

This application is a Continuation-in-part of International Application No. PCT/CN2022/111312, filed on Aug. 10, 2022, which claims priority to Chinese Patent Application No. 202210933815.X, filed on Aug. 4, 2022, the entire contents of which are hereby incorporated by reference.

TECHNICAL FIELD

The present disclosure relates to the technical field of waste treatment, and in particular, to devices for controlling to remove food waste digestion foam.

BACKGROUND

Food waste is treated by adopting an anaerobic digestion technology, which not only realizes reduction and harmlessness of the food waste but also realizes energization and resourceization of the food waste. However, foaming is a common problem in an anaerobic digestion system, and foaming events are more frequent when there is food waste in a digested substrate. The foaming may lead to economic losses, increase difficulties of reactor operation, and cause environmental and safety risks. Therefore, exploring the foaming mechanism and developing defoaming strategies have attracted a lot of attention from researchers. Currently, the most common method is to add a defoamer, but adding the defoamer not only increases operation costs but also puts an extra burden on digestive microorganisms.

Therefore, it is desirable to provide a device for controlling to remove food waste digestion foam that can cost-effectively remove foam from the anaerobic digestion system.

SUMMARY

One or more embodiments of the present disclosure provide a device for controlling to remove food waste digestion foam. The device for controlling to remove food waste digestion foam includes a digestion tank. The digestion tank includes two hermetically sealed boxes. Each of the two boxes is opened with a liquid inlet connected to an interior of each of the two boxes. A conveying mechanism is connected between the two boxes, and the conveying mechanism conveys a gas in the two boxes in a reciprocal manner.

In some embodiments, a partition is disposed inside the digestion tank, and the partition divides the digestion tank into the two boxes distributed left and right.

In some embodiments, each of the two boxes is connected to an ammonia access pipe, a methanol access pipe, a volatile fatty acid (VFA) online analyzer, and an ammonia online analyzer.

In some embodiments, a gas pipe is disposed in each of the two boxes, one end of the gas pipe extends out of each of the two boxes and is connected to the conveying mechanism, and the other end of the gas pipe is inserted into a bottom of each of the two boxes.

In some embodiments, the gas pipe is installed with a first check valve only allowing gas to flow from the bottom of each of the two boxes to the conveying mechanism, a branch pipe is disposed at a downstream position of the first check valve of the gas pipe, and the branch pipe is installed with a second check valve only allowing gas to enter the branch pipe.

In some embodiments, a cover plate is disposed inside each of the two boxes, and the cover plate divides each of the two boxes into two chambers distributed above and below.

In some embodiments, the cover plate is inserted with a distribution pipe extending upwards, the distribution pipe allows gas to circulate between the two chambers, and the branch pipe is located between the distribution pipe and a sidewall of each of the two boxes.

In some embodiments, the conveying mechanism includes a fan, and the fan is a forward and reverse fan.

In some embodiments, the conveying mechanism includes two fans connected in parallel, and the two fans have opposite conveying directions.

In some embodiments, the gas pipe is installed with a shut-off valve at a position close to the conveying mechanism.

In some embodiments, a cleanout door connected to the chamber is disposed at a position above the cover plate of a sidewall of each of the two boxes.

In some embodiments, both sides of the conveying mechanism are provided with defoaming fillers.

In some embodiments, each of the two boxes is installed with a pressure gauge.

In some embodiments, the device for controlling to remove food waste digestion foam further comprises an image sensor and a processor. The image sensor is disposed inside the digestion tank, and the processor is communicatively connected to the image sensor and the conveying mechanism, respectively.

In some embodiments, the processor is configured to: identify and determine a foam feature within each of the two boxes based on an internal image of the digestion tank obtained from the image sensor, the foam feature including at least a foam volume, and determine a set pressure difference of the two boxes based on the foam feature within each of the two boxes and control the conveying mechanism to convey gas from the interior of one of the two boxes to the interior of the other of the two boxes according to the set pressure difference.

In some embodiments, the foam feature further includes a foam feature distribution, and the foam feature distribution includes an image feature vector corresponding to each of a plurality of preset regions obtained by dividing the internal image of the digestion tank.

In some embodiments, the processor is further configured to: predict, based on one or more candidate pressure differences, estimated foam dissolution rates corresponding to the one or more candidate pressure differences through a dissolution rate prediction model, and determine the set pressure difference based on the estimated foam dissolution rates, wherein the dissolution rate prediction model is a machine learning model.

In some embodiments, an input of the dissolution rate prediction model further includes a food waste composition and a carbon-nitrogen ratio set for a current anaerobic digestion.

In some embodiments, the device for controlling to remove food waste digestion foam further comprises a bubble elimination net. A surface of the bubble elimination net has a spiked structure.

In some embodiments, the bubble elimination net is provided with a temperature control unit, and the temperature control unit is configured to adjust a temperature of the bubble elimination net. The processor is further configured to: determine a preferred temperature of the bubble elimination net, and control the temperature control unit to adjust the temperature of the bubble elimination net based on the preferred temperature.

BRIEF DESCRIPTION OF THE DRAWINGS

The present disclosure will be further illustrated by way of exemplary embodiments, which will be described in detail by means of the accompanying drawings. These embodiments are not limiting, and in these embodiments the same numbering indicates the same structure, wherein.

DETAILED DESCRIPTION

In order to more clearly illustrate the technical solutions of the embodiments of the present disclosure, the accompanying drawings to be used in the description of the embodiments will be briefly described below. Obviously, the accompanying drawings in the following description are only some examples or embodiments of the present disclosure, and it is possible for a person of ordinary skill in the art to apply the present disclosure to other similar scenarios in accordance with the accompanying drawings without creative labor. Unless obviously obtained from the context or the context illustrates otherwise, the same numeral in the drawings refers to the same structure or operation.

Figure 1:
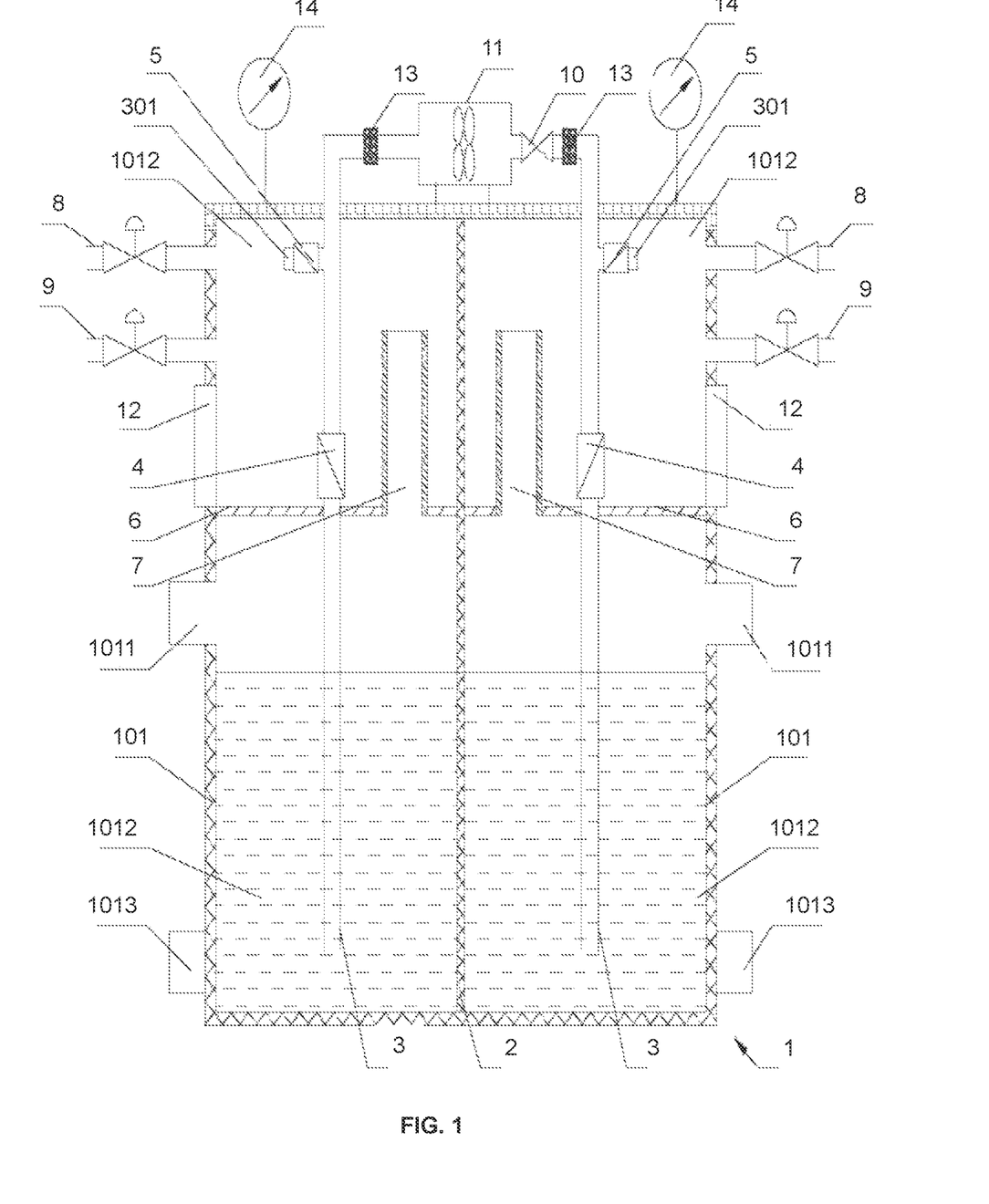
FIG. 1 is a diagram illustrating an exemplary structure of a device for controlling to remove food waste digestion foam according to some embodiments of the present disclosure.

FIG. 1 is a diagram illustrating an exemplary structure of a device for controlling to remove food waste digestion foam according to some embodiments of the present disclosure. Some of the following embodiments may be understood with reference to FIG. 1, but the accompanying drawing is merely for the purpose of illustration of some of these embodiments and does not constitute a limitation of the embodiments.

As shown in FIG. 1, the device for controlling to remove food waste digestion foam includes a digestion tank 1. The digestion tank 1 refers to a container for performing a digestion reaction on the food waste. In some embodiments, the digestion tank 1 includes two hermetically sealed boxes 101. Each of the two box 101 is opened with a liquid inlet 1011 connected to an interior of each of the two boxes 101. A conveying mechanism 11 is connected between the two boxes 101, and the conveying mechanism 11 conveys a gas in the two boxes 101 in a reciprocal manner. In some embodiments, each of the two boxes 101 is also provided with a drain outlet 1013 connected to the interior of each of the two boxes 101. The food waste may respectively enter the interiors of the two boxes 101 through the two liquid inlets 1011, and be discharged from the two drain outlets 1013 accordingly after the digestion reaction is completed.

In some embodiments, the two boxes 101 are two independently disposed components. In some embodiments, a partition 2 is disposed inside the digestion tank 1, and the partition divides the digestion tank 1 into the two boxes 101 distributed left and right.

The conveying mechanism 11 refers to a device for conveying the gas. In some embodiments, the conveying mechanism 11 may include a fan. In some embodiments, the fan is a forward and reverse fan. When the forward and reverse fan rotates in different directions, the gas is conveyed in opposite directions, so as to realize reciprocal conveying of the gas. In some embodiments, as shown in FIG. 1, the forward and reverse fan is connected between the two boxes 101, and the forward and reverse fan is configured to convey the gas in the two boxes 101 in a reciprocal manner. For example, when the forward and reverse fan rotates forwardly, the gas in the left box 101 enters a gas pipe 3 through a branch pipe 301 in the gas pipe 3 and is conveyed to the right box 101, so that a pressure in the left box 101 decreases and a pressure in the right box 101 increases. As another example, when the forward and reverse fan rotates reversely, the gas in the right box 101 enters the gas pipe 3 through the branch pipe 301 in the gas pipe 3 and is conveyed to the left box 101, so that the pressure in the left box 101 increases and the pressure in the right box 101 decreases. In the box 101 with a relatively small pressure, an internal pressure of the foam is greater than an external pressure, which causes the foam to burst. In the box 101 with a relatively great pressure, the internal pressure of the foam is smaller than the external pressure, which causes the foam to be compressed and bubbles to become small or disappear. When the pressure in the box 101 with the relatively great pressure increases to 1.5 to 2.5 atmospheres, the forward and reverse fan stops working. After 5 to 10 hours, the forward and reverse fan is turned on for reverse conveying, and the fan stops again when a pressure gauge 14 on one of the boxes 101 reaches a set value.

In some embodiments of the present disclosure, the gas is conveyed reciprocally by the forward and reverse fan, so that the left and right boxes are alternately depressurized and pressurized to defoam. The defoaming process is achieved physically without adding any reagent, which makes the defoaming method cost-effective and efficient.

Figure 2:
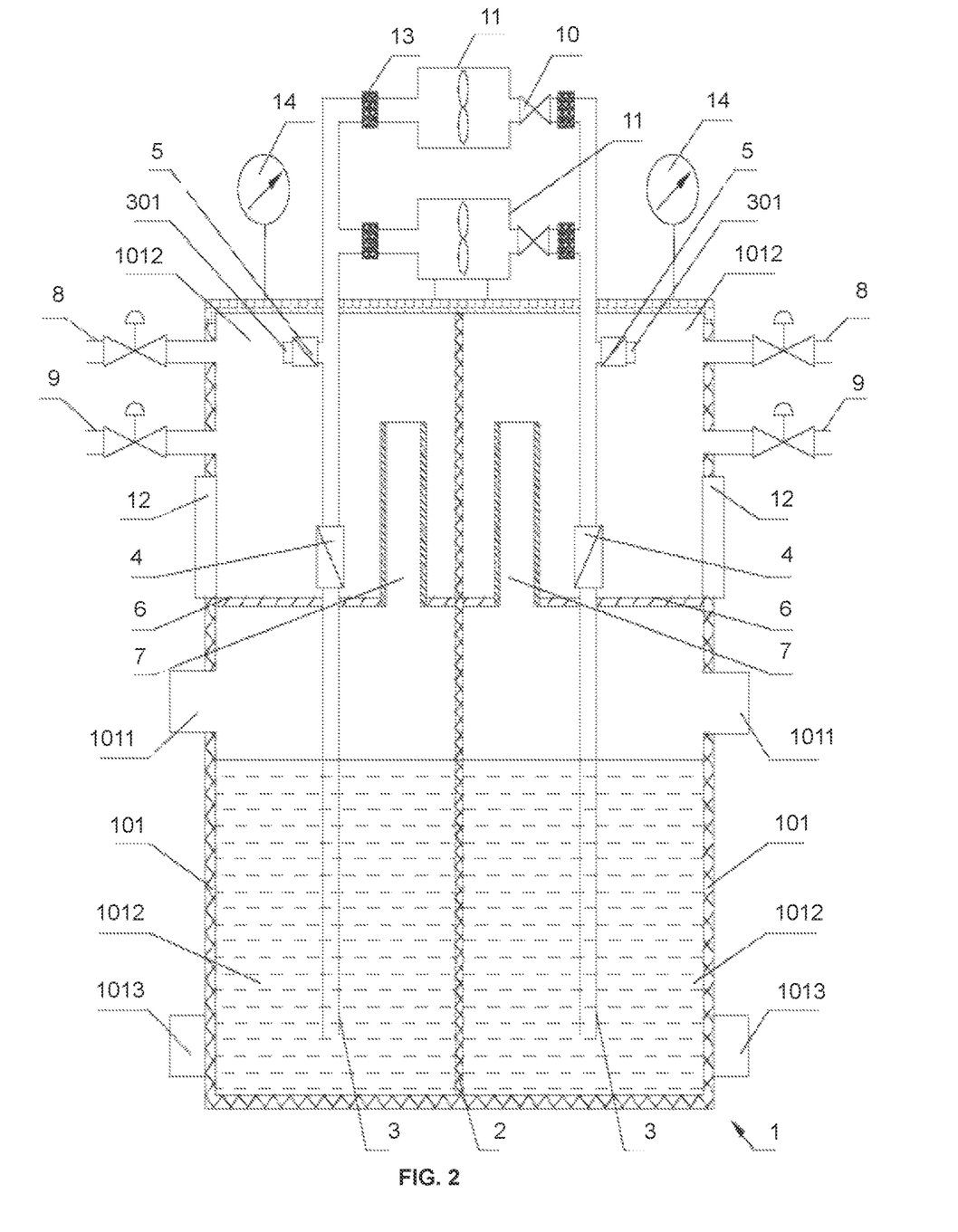
FIG. 2 is a diagram illustrating another exemplary structure of the device for controlling to remove food waste digestion foam according to some embodiments of the present disclosure.

FIG. 2 is a diagram illustrating another exemplary structure of a device for controlling to remove food waste digestion foam according to some embodiments of the present disclosure.

In some embodiments, as shown in FIG. 2, the conveying mechanism 11 may include two fans connected in parallel. The two fans have opposite conveying directions, and the two fans may be turned on alternately to realize alternating pressurization and depressurization of the two boxes 101.

In some embodiments, the gas pipe 3 is disposed in each of the two boxes 101. One end of the gas pipe 3 extends out of each of the two boxes 101 and is connected to the conveying mechanism 11, and the other end of the gas pipe 3 is inserted into a bottom of each of the two boxes 101. In some embodiments, the gas pipe 3 is inserted into a gas hole opened at a top of each of the two boxes 101, and the gas hole may fix a position of the gas pipe 3. In some embodiments, both ends of the conveying mechanism 11 are respectively connected to two gas pipes 3 to convey the gas in the two boxes 101 in a reciprocal manner.

In some embodiments, the gas pipe 3 is installed with a first check valve 4 only allowing the gas to flow from the bottom of each of the two boxes 101 to the conveying mechanism 11. The branch pipe 301 is disposed at a downstream position of the first check valve 4 of the gas pipe 3, and the branch pipe 301 is installed with a second check valve 5 only allowing the gas to enter the branch pipe. In some embodiments, the branch pipe 301 is located inside each of the two boxes 101 and above a digestive fluid.

When the forward and reverse fan is turned on, ammonia and volatile fatty acids inside one of the two boxes 101 enter the gas pipe 3 through the branch pipe 301 in the gas pipe 3 and are conveyed to the bottom of the other box 101, so that the ammonia and volatile fatty acids are dissolved into the digestive liquid of the food waste, which avoids an accumulation of the ammonia and volatile fatty acids and improves a microbial growth environment. The transfer of the ammonia and volatile fatty acids also adjusts a pondus Hydrogenii (pH), avoiding a relatively low local pH caused by the accumulation of the volatile fatty acids. Anaerobic fermentation bacteria, especially methane bacteria, are extremely sensitive to an acid concentration in a reaction system. The growth of methane bacteria is inhibited under a relatively low pH condition. By online monitoring of a concentration of the volatile fatty acids, when the concentration becomes too high, ammonia may be automatically introduced to adjust the pH.

In some embodiments, as shown in FIG. 1, each of the two boxes 101 is connected to an ammonia access pipe 8, a methanol access pipe 9, a volatile fatty acid (VFA) online analyzer, and an ammonia online analyzer. A suitable carbon-nitrogen ratio in an anaerobic digestion process is generally in a range of 1:20 to 1:30. The carbon-nitrogen ratio may not be too high or too low. If the carbon-nitrogen ratio is too high or too low, the anaerobic digestion process may be affected. An unsuitable carbon-nitrogen ratio may lead to a large release of the ammonia or an excessive accumulation of the VFA. Both the ammonia and the VFA are important intermediate products in the anaerobic digestion, and both an unsuitable ammonia concentration and an unsuitable VFA concentration may inhibit a methane fermentation process. The VFA online analyzer and the ammonia online analyzer may measure the ammonia concentration and the VFA concentration in a gas phase online in real time and automatically calculate a ratio of the ammonia concentration to the VFA concentration. When the ratio of the ammonia concentration to the VFA concentration is smaller than a range of 1:15 to 1:20, a control valve of the ammonia access pipe 8 is automatically opened. When the ratio of the ammonia concentration to the VFA concentration is greater than a range of 1:15 to 20, a control valve of the methanol access pipe 9 is automatically opened. In this way, the carbon-nitrogen ratio within the digestive liquid may be adjusted and maintained within an optimal digestion range and the digestion process is carried out smoothly. The ammonia and the VFA are introduced to adjust the concentrations, which is generally fine-tuned. That is, only a small amount of gas needs to be introduced, which has a small effect on the gas pressure inside the boxes 101 and does not affect the defoaming process.

In some embodiments, as shown in FIG. 1, a cover plate 6 is disposed inside each of the two boxes 101. The cover plate 6 divides each of the two boxes 101 into two chambers 1012 distributed above and below. In some embodiments, the cover plate 6 is inserted with a distribution pipe 7 extending upwards, the distribution pipe allows gas to circulate between the two chambers 1012, and the branch pipe 301 is located between the distribution pipe 7 and a sidewall of each of the two boxes 101. In some embodiments, a cleanout door 12 connected to the chamber 1012 is disposed at a position above the cover plate 6 of a sidewall of each of the two boxes 101.

In some embodiments, when entering through the liquid inlet 1011, the food waste is controlled to be below the cover plate 6. The forward and reverse fan is turned on, and the gas in the chamber 1012 distributed below enters the branch pipe 301 through the distribution pipe 7. When the gas contains a small amount of foam, the foam may fall above the cover plate 6 surrounded by the sidewall of the box 101 and the distribution pipe 7 in a process of the gas flowing to the branch pipe 301 through the distribution pipe 7. The cleanout door 12 connected to the chamber 1012 is disposed at the position above the cover plate 6 of the sidewall of the box 101, so that when a relatively large amount of foam accumulates, the cleanput door 12 may be opened to clean the foam.

In some embodiments, the device for controlling to remove food waste digestion foam further includes a bubble elimination net. A surface of the bubble elimination net has a spiked structure. The bubble elimination net is a mesh structure, and the digestive liquid may pass through the bubble elimination net. The spiked structure of the bubble elimination net may be configured to prick bubbles and make the bubbles burst, thereby reducing the foam. In some embodiments, the bubble elimination net (not shown) may be disposed below the cover plate 6, and a coverage of the bubble elimination net may be an entire lower side of the cover plate 6 or a portion of a position where the bubbles are prone to be generated. In some embodiments, the bubble elimination net may move vertically up and down, but a speed of movement may not exceed a preset range to avoid accelerating the generation of bubbles due to an excessive speed of movement. In some embodiments, a material of the bubble elimination net may be a conductive material such as iron oxide, etc. The conductive material may strengthen a transfer of electrons and energy between the methanogenic bacteria and other bacteria, thereby accelerating the anaerobic digestion reaction process.

In some embodiments, as shown in FIG. 1, the gas pipe 3 is installed with a shut-off valve 10 at a position close to the conveying mechanism 11. The shut-off valve 10 refers to a valve used to shut off a flow of gas. When the conveying mechanism 11 is turned on to make a difference between the pressures generated inside the two boxes reach a preset value, the conveying mechanism 11 is turned off, and at the same time, the shut-off valve 10 is turned off, so that internal pressures of the two boxes may be maintained, and the two boxes 101 are kept in a sealed and disconnected state.

In some embodiments, both sides of the conveying mechanism 11 are provided with defoaming fillers 13. The defoaming fillers 13 refer to fillers that is capable of eliminating foam. In some embodiments, the defoamer fillers 13 may be multi-layer cotton nets. The defoamer fillers 13 may intercept a small amount of foam as the foam enters the gas pipe 3 through the branch pipe 301.

In some embodiments, each of the two boxes 101 is installed with a pressure gauge 14. The pressure gauge 14 is configured to measure the gas pressure in the boxes 101.

The working principle and usage process of the device for controlling to remove food waste digestion foam in some embodiments of the present disclosure are as follows.

As shown in FIGS. 1 and 2, after the food waste is crushed and degreased, the food waste is pumped into the digestion tank 1 from the liquid inlets 1011 on the left and right with a pump, and the food waste injected into the digestion tank 1 is controlled to be below the cover plate 6. The liquid inlets 1011 are closed to start the anaerobic digestion reaction. When the food waste in the digestion tank 1 foams, the fan is turned on to convey the gas in one of the two boxes 101 to the other box 101, so that the pressure in one box 101 increases while the pressure in the other box 101 decreases. The pressure difference between the left and right boxes 101 gradually increases. In the box 101 with a relatively small pressure, the internal pressure of the foam is greater than a pressure in a surrounding region, and the foam burst. In the box 101 with a relatively great pressure, the internal pressure of the foam is smaller than the pressure in a surrounding region, the foam is compressed, and the bubbles become small or disappear. When the pressure in the box 101 with the relatively great pressure increases to 1.5 to 2.5 atmospheres, the fan stops working and the shut-off valve 10 is turned off in tandem for 5 to 10 hours, and the shut-off valve 10 is turned on and the fan rotates reversely. When the pressure of the pressure gauge 14 installed on the other box 101 reaches a set value, the fan is turned off again and the shut-off valve 10 is turned off. In this way, the gas is conveyed in a reciprocal manner through the conveying mechanism, so that the pressure difference between the two boxes is generated to remove the foam.

In the device for controlling to remove food waste digestion foam in some embodiments of the present disclosure, the gas is conveyed in the reciprocal manner through the conveying mechanism to generate the pressure difference between the two boxes to remove the foam. In a first aspect, the defoaming process adopts physical defoaming without adding any reagent, which makes the defoaming method cost-effective and efficient and does not affect the anaerobic reaction process due to the addition of the chemical defoaming agent. In a second aspect, the entire device for controlling to remove food waste digestion foam has a simple structure, is easy to operate, and the process is controllable. In a third aspect, the ammonia concentration and the VFA concentration may be measured online in real time and the control valves of the ammonia access pipe and the methanol access pipe may be automatically controlled, so that the carbon-nitrogen ratio may be maintained within the optimal digestion range, and the digestion process is carried out smoothly.

In some embodiments, the device for controlling to remove food waste digestion foam further includes an image sensor and a processor. The image sensor is configured to obtain an image and transmit a signal. For example, the image sensor includes a camera or the like. The image sensor may be disposed inside the digestion tank and configured to obtain an internal image of the digestion tank. The processor is configured to process at least one of data or information obtained from other devices or system components. The processor may execute a program instruction based on at least one of the data, the information, or a processing result to perform one or more functions described in the present disclosure. In some embodiments, the processor is communicatively connected to the image sensor and the conveying mechanism, respectively.

In some embodiments, the processor is configured to identify and determine a foam feature within each of the two boxes based on the internal image of the digestion tank obtained from the image sensor, the foam feature including at least a foam volume, and determine a set pressure difference of the two boxes based on the foam feature within each of the two boxes and control the conveying mechanism to convey gas from the interior of one of the two boxes to the interior of the other of the two boxes according to the set pressure difference.

The foam feature refers to a feature related to the foam. For example, the foam feature includes a foam size, a foam distribution, etc. In some embodiments, the foam feature includes at least an amount of foam, wherein the amount of foam refers to a count of the foam.

In some embodiments, the processor may identify and determine the foam feature within each of the two boxes based on the internal image of the digestion tank obtained from the image sensor through an image recognition model. The image recognition model may be a machine learning model. An input of the image recognition model is the internal image of the digestion tank, and an output of the image recognition model is the amount of foam within each of the two boxes. In some embodiments, the image recognition model may be obtained by training a plurality of first training samples with labels. In some embodiments, the first training samples may include at least internal images of sample digestion tanks. The first training samples may be obtained from historical data. The labels may be amounts of sample foam. In some embodiments, the amounts of sample foam in a physical sense may be obtained by chemical measurement of entire foam inside the sample digestion tanks. In some embodiments, the amounts of sample foam may be determined based on a manual visual criteria. For example, the amounts of sample foam corresponding to the internal images of the sample digestion tanks are manually calibrated based on coverages of the foam and densities of the foam.

The set pressure difference refers to a difference between preset gas pressures of the two boxes. A relatively good foam elimination effect may be achieved under the set pressure difference. In some embodiments, the processor is communicatively connected to the pressure gauge, and the processor may obtain a current gas pressure in each of the two boxes through the pressure gauge and obtain an actual pressure difference. The processor conveys the gas inside one of the two boxes into the other box by controlling the conveying mechanism, so that the actual pressure difference is consistent with the set pressure difference.

In some embodiments, the foam feature may further include a foam feature distribution. The foam feature distribution includes an image feature vector corresponding to each of a plurality of preset regions obtained by dividing the internal image of the digestion tank. In some embodiments, at a certain moment, the internal image of the digestion tank may be divided into one or more preset regions, and for each of the one or more preset regions, the image feature vector is extracted. Exemplarily, the processor obtains the internal image of the digesting tank through the image sensor, divides the image into 9 grid regions labeled 1 to 9, and identifies a grid region in which foam exists through an image recognition technique. For example, the processor identifies that the foam exists in Grids 5, 7, 8, and 9, and does not exist in other Grids. If the image feature vector is extracted individually for each grid region where the foam exists and a grid region where the foam does not exist is identified as null, the foam feature distribution may be {(Grid 1, Null), (Grid 2, Null), (Grid 3, Null), (Grid 4, Null), (Grid 5, Image feature vector 1), (Grid 6, Null), (Grid 7, Image feature vector 2), (Grid 8, Image feature vector 3), (Grid 9, Image feature vector 4)}.

In some embodiments, the processor may predict, based on one or more candidate pressure differences, estimated foam dissolution rates corresponding to the one or more candidate pressure differences through a dissolution rate prediction model, and determine a candidate pressure difference corresponding to an estimated foam dissolution rate with a maximum value as an optimal value based on the estimated foam dissolution rates, thereby determining the set pressure difference.

In some embodiments, the dissolution rate prediction model is a machine learning model. For example, the dissolution rate prediction model may include a convolutional neural network (CNN) model, a neural network (NN) model, other customized model structures, or the like, or any combination thereof.

In some embodiments, an input of the dissolution rate prediction model may include foam features of each of the two boxes and the one or more candidate pressure differences at a plurality of moments within a preset period of time, and an output of the dissolution rate prediction model may include estimated foam dissolution rates. The foam features at the plurality of moments within the preset period of time include at least the amounts of foam and the foam feature distributions. The estimated foam dissolution rates may represent average foam dissolution rates over a relatively long time scale (e.g., several hours). In some embodiments, the estimated foam dissolution rates may be outputted by performing a prediction on a situation over the relatively long time scale based on the data over the preset period of time (i.e., a relatively short time scale (e.g., 5 minutes)) through the dissolution rate prediction model. Data related to one of the two boxes may be separately inputted into the dissolution rate prediction model. Data related to the two boxes may be inputted into the dissolution rate prediction model at the time, and the estimated foam dissolution rates corresponding to each of the two boxes may be output, respectively.

In some embodiments, the dissolution rate prediction model may be trained based on a large number of second training samples with labels. The second training samples may be sample foam features and sample pressure differences of the box at a plurality of moments. In some embodiments, the second training samples may be obtained based on historical data. Labels of the second training samples are actually measured foam dissolution rates under the sample foam features and the sample pressure differences. The labels may be manually labeled.

In some embodiments, the processor may determine the candidate pressure difference corresponding to the estimated foam deflation rate with a maximum value as the optimal value based on the estimated foam dissolution rates corresponding to the one or more candidate pressure differences outputted by the dissolution rate prediction model, and determine the optimal value as the set pressure difference.

In some embodiments, for the estimated foam dissolution rates corresponding to each of the two boxes outputted by the dissolution rate prediction model, the estimated foam dissolution rates corresponding to each of the two boxes may be summed, and a candidate pressure difference corresponding to a maximum summed value is determined as the optimal value.

In other embodiments, since the chemical reaction is related to a pressure in a reaction environment, for the estimated foam dissolution rates corresponding to each of the two boxes outputted by the dissolution rate prediction model, the estimated foam dissolution rates corresponding to each of the two boxes may be summed, and a candidate pressure difference corresponding to the maximum summed value may be determined as the optimal value. The maximum summed value satisfies a preset pressure condition. The preset pressure condition is related to a feature such as a food waste composition, a carbon-nitrogen ratio, etc., which may be set manually based on experience. In some embodiments, the preset pressure condition may be a single pressure value or a pressure range.

In some embodiments of the present disclosure, the estimated foam dissolution rates may be predicted using the foam dissolution rate prediction model, the optimal set pressure difference may be determined, and at the same time, it is ensured that the set pressure difference satisfies the pressure range of the anaerobic digestion reaction, so that a more accurate set pressure difference with a higher foam dissolution rate can be obtained, which is conducive to ensuring the efficient elimination of the foam in the anaerobic reaction.

In some embodiments, the input of the dissolution rate prediction model further includes the food waste composition and a carbon-nitrogen ratio set for a current anaerobic digestion. The food waste composition and the carbon-nitrogen ratio affect the efficiency and process of the anaerobic digestion, and the food waste composition and the carbon-nitrogen ratio are also root causes of foaming. Therefore, the input of the digestion rate prediction model includes the food waste composition and the carbon-nitrogen ratio, which can improve the accuracy of predicting a future foam dissolution rate.

In some embodiments, the input of the dissolution rate prediction model may also include a candidate temperature of the bubble elimination net. Since the digestion reaction is related to a temperature in the reaction environment, the accuracy of the output of the dissolution rate prediction model may be improved by inputting the temperature of the bubble elimination net into the dissolution rate prediction model.

In some embodiments, the bubble elimination net may be provided with a temperature control unit. The temperature control unit is configured to adjust a temperature of the bubble elimination net. The temperature control unit may be communicatively connected to the processor. In some embodiments, the temperature control unit may include a heater.

In some embodiments, the processor may determine a preferred temperature of the bubble elimination net, and control the temperature control unit to adjust the temperature of the bubble elimination net based on the preferred temperature.

In some embodiments, the processor may input a plurality of different candidate temperatures of the bubble elimination net into the dissolution rate prediction model, and the dissolution rate prediction model may output estimated foam dissolution rates. The processor may determine a candidate temperature of the bubble elimination net corresponding to an estimated bubble elimination rate with a maximum value as the preferred temperature. In other embodiments, the processor may also determine a relatively low candidate temperature of the bubble elimination net corresponding to a relatively great estimated foam dissolution rate as the preferred temperature. By taking into account both foam elimination efficiency and energy consumption, energy savings are achieved when the foam elimination efficiency is satisfied. In some embodiments, since the chemical reaction is related to the temperature in the reaction environment, the preferred temperature may need to be within a preset temperature range to prevent an impact on the food waste digestion reaction. In some embodiments, the preset temperature range may be different for different food waste compositions, carbon-nitrogen ratios, or microflora. The preset temperature range may be determined manually based on experience or experimentally.

In some embodiments of the present disclosure, the set pressure difference and the preferred temperature of the bubble elimination net are determined through the elimination rate prediction model, so that a more accurate set pressure difference and temperature of the bubble elimination net with a higher foam elimination rate can be obtained, which is conducive to ensuring the efficient elimination of the foam in the anaerobic reaction.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various parts of this specification are not necessarily all referring to the same embodiment. In addition, some features, structures, or features in the present disclosure of one or more embodiments may be appropriately combined.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, the numbers expressing quantities or properties used to describe and claim certain embodiments of the present disclosure are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A method for controlling to remove food waste digestion foam, adopting a device to remove foam, wherein the device comprises a hermetically sealed digestion tank, a partition is disposed inside the digestion tank, the partition divides the digestion tank into two hermetically sealed boxes distributed left and right, each of the two boxes is opened with a liquid inlet connected to an interior of each of the two boxes, and a conveying mechanism is connected between the two boxes;

a gas pipe is disposed in each of the two boxes, one end of the gas pipe extends out of each of the two boxes and is connected to the conveying mechanism, the other end of the gas pipe is inserted into a bottom of each of the two boxes, the gas pipe is installed with a first check valve only allowing gas to flow from the bottom of each of the two boxes to the conveying mechanism, a branch pipe is disposed at a downstream position of the first check valve of the gas pipe, and the branch pipe is installed with a second check valve only allowing gas to enter the branch pipe;

a cover plate is disposed inside each of the two boxes, the cover plate divides each of the two boxes into two chambers distributed above and below, the cover plate is inserted with a distribution pipe extending upwards, the distribution pipe allows gas to circulate between the two chambers, and the branch pipe is located between the distribution pipe and a sidewall of each of the two boxes; and the conveying mechanism is configured to convey a gas in the two boxes in a reciprocal manner to increase a pressure in one box for pressurization and defoaming and decrease a pressure in another box for depressurization and defoaming, the conveying mechanism stops working when the pressure in the box with a relatively great pressure increases to 1.5 atmospheres to 2.5 atmospheres, and after 5 hours to 10 hours, the conveying mechanism is turned on for reverse conveying.

2. The method for controlling to remove food waste digestion foam of claim 1, wherein each of the two boxes is connected to an ammonia access pipe, a methanol access pipe, a volatile fatty acid (VFA) online analyzer, and an ammonia online analyzer.

3. The method for controlling to remove food waste digestion foam of claim 1, wherein the conveying mechanism includes a fan, and the fan is a forward and reverse fan.

4. The method for controlling to remove food waste digestion foam of claim 1, wherein the conveying mechanism includes two fans connected in parallel, and the two fans have opposite conveying directions.

5. The method for controlling to remove food waste digestion foam of claim 1, wherein the gas pipe is installed with a shut-off valve at a position close to the conveying mechanism.

6. The method for controlling to remove food waste digestion foam of claim 1, wherein a cleanout door connected to the chamber is disposed at a position above the cover plate of a sidewall of each of the two boxes.

7. The method for controlling to remove food waste digestion foam of claim 1, wherein both sides of the conveying mechanism are provided with defoaming fillers.

* * * * *